United States Patent
Bonk

(10) Patent No.: US 6,520,583 B1
(45) Date of Patent: Feb. 18, 2003

(54) COMPACT DISC RECLINER

(75) Inventor: Jeffery T. Bonk, Clinton Township, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/645,844

(22) Filed: Aug. 24, 2000

(51) Int. Cl.$^7$ ................................................. B60N 2/02
(52) U.S. Cl. ..................................... 297/367; 192/223.1
(58) Field of Search ......................... 297/367; 192/223.1

(56) References Cited

U.S. PATENT DOCUMENTS

| | | | |
|---|---|---|---|
| 4,087,885 A | * | 5/1978 | Gillentine |
| 4,767,158 A | * | 8/1988 | Satoh |
| 4,884,845 A | * | 12/1989 | Schmale et al. |
| 5,590,931 A | * | 1/1997 | Fourrey et al. |
| 5,622,407 A | * | 4/1997 | Yamada et al. |
| 5,664,838 A | | 9/1997 | Baloche |
| 5,681,086 A | | 10/1997 | Baloche |
| 5,692,589 A | | 12/1997 | Beguin |
| 5,709,133 A | | 1/1998 | Coggon et al. |
| 5,725,452 A | | 3/1998 | Droulon et al. |
| 5,755,491 A | | 5/1998 | Baloche et al. |
| 5,769,494 A | * | 6/1998 | Barrere et al. |
| 5,779,313 A | | 7/1998 | Rohee |
| 5,788,325 A | | 8/1998 | Ganot |
| 5,820,218 A | | 10/1998 | Baloche et al. |
| 5,820,219 A | | 10/1998 | Rohee |
| 5,881,854 A | | 3/1999 | Rougnon-Glasson |
| 5,934,753 A | | 8/1999 | Lange |
| 5,984,413 A | * | 11/1999 | Baloche et al. |
| 6,007,152 A | * | 12/1999 | Kojima et al. |
| 6,039,400 A | * | 3/2000 | Yoshida et al. |
| 6,082,821 A | * | 7/2000 | Baloche |
| 6,085,386 A | * | 7/2000 | Blanchard et al. |
| 6,112,370 A | * | 9/2000 | Blanchard et al. |
| 6,149,235 A | * | 11/2000 | Fahim |
| 6,164,723 A | * | 12/2000 | Ganot |
| 6,224,157 B1 | * | 5/2001 | Di Luccio |
| 6,253,894 B1 | * | 6/2001 | Schumann et al. |

FOREIGN PATENT DOCUMENTS

FR 2578602 * 9/1986 ................. 297/367

* cited by examiner

Primary Examiner—Robert Canfield
(74) Attorney, Agent, or Firm—Harness, Dickey & Pierce, P.L.C.

(57) ABSTRACT

A compact disc recliner mechanism for reducing chucking includes a drum adapted to be fixed to a quadrant for rotation relative to a plate and three locking members having locking surfaces for locking said quadrant relative said plate. At least one locking member moves relative the quadrant from a first position engaging the drum to a second position disengaging the drum. At least one other locking member is fixed relative the plate and movable from a first position engaging the drum to a second position disengaging the drum. A cam moves the first, second, and third locking members from a first position engaging the drum to a second position disengaging the drum. A recliner assembly for use with a seat having a seat back and a seat base includes the compact disc recliner mechanism according to the invention.

24 Claims, 5 Drawing Sheets

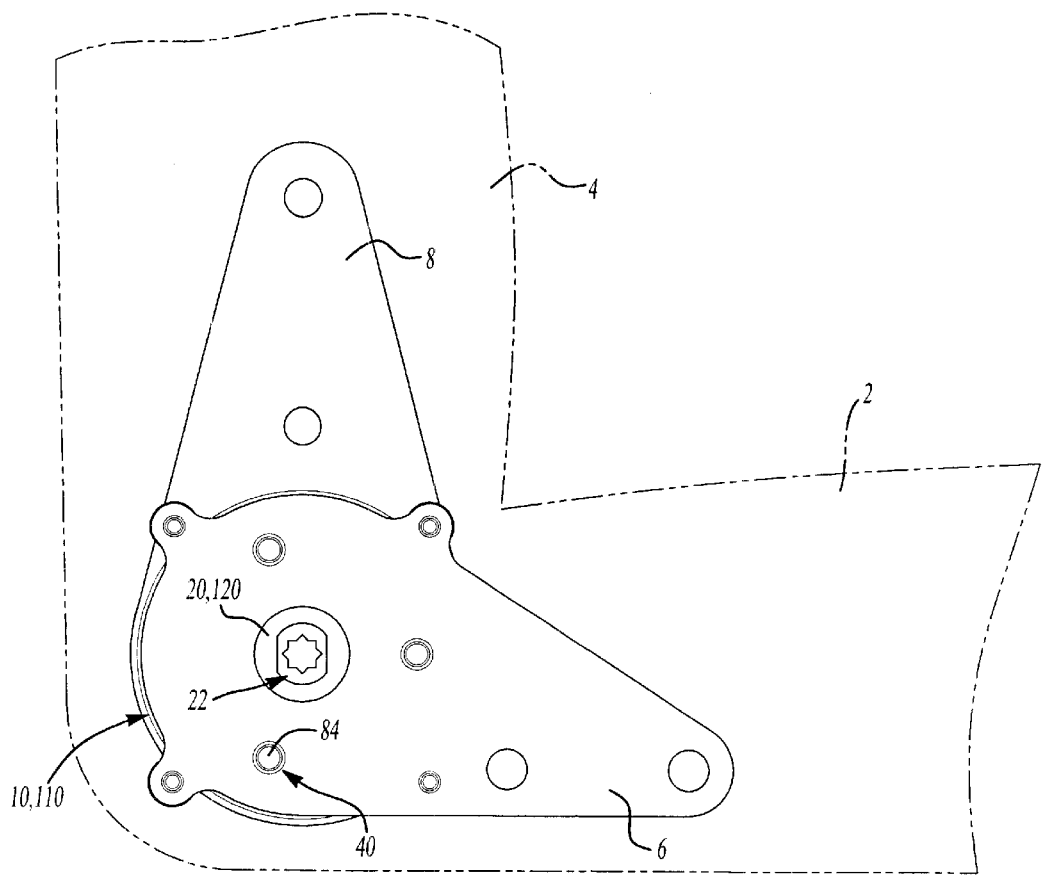
_Fig-1_
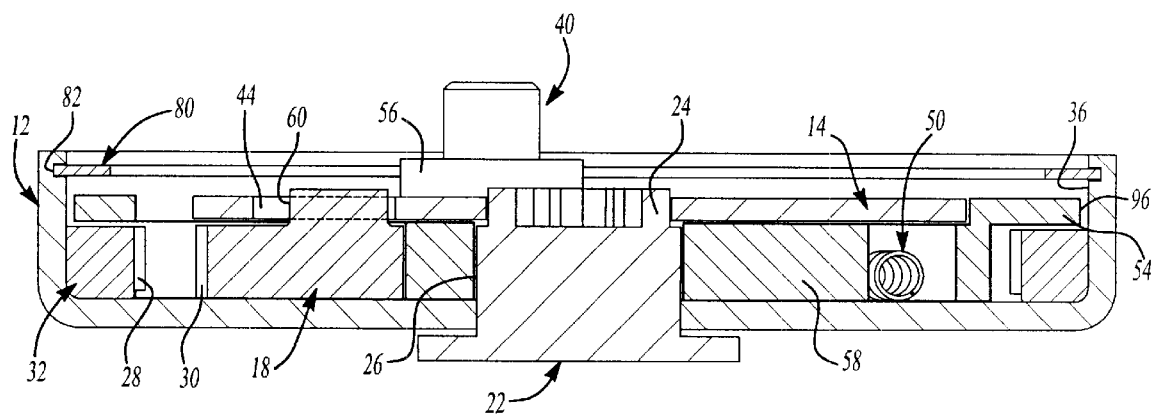
_Fig-5_

COMPACT DISC RECLINER

BACKGROUND OF THE INVENTION

This invention relates generally to a recliner mechanism and, more particularly, to a compact disc recliner mechanism for reducing undesirable movement when the mechanism is locked.

Rotary recliner mechanisms generally consist of a first rotary member having a plurality of teeth and a second rotary member including one or more pawls adapted to lockingly engage the teeth to couple the rotary members to one another. Typically, one rotary member is mounted to a quadrant for attachment to a seat back and the second rotary member is mounted to a base plate for attachment to a seat base. The rotary recliner mechanisms are operable to lock the rotary member connected to the seat back to restrict its rotation, or to release the rotary member connected to the seat back to allow it to rotate and to enable the seat back to recline. The mechanism is selectively locked or released by manipulating the one or more pawls, which are mounted for rotation between an engaged position where the teeth of the pawl and the teeth of the rotary member connected to the seat base mesh, and a disengaged position where the pawl retracts and no longer meshes with the teeth of the rotary member connected to the seat base. Locking rotary recliner mechanisms also may include a device, such as a spring, for releasably urging the pawl from the disengaged to the engaged position so that the default position for the mechanism is a locked condition. Further, the rotary recliner typically includes an activating mechanism that moves the pawl from the engaged position to the disengaged position.

In reclining seats, the seat back functions as an extremely long lever arm against which various forces are applied. The locking rotary recliner mechanism in a vehicle seat is relatively small compared to the length of the reclining seat back, and vehicle vibration or movement of an occupant may impose various forces upon that lever during use. These forces impose a large moment about the rotary member connected to the seat back when applied along such a lengthy lever arm. If the forces are sufficient, or the rotary recliner mechanism is poorly designed, these forces can overcome the capability of the rotary recliner mechanism to anchor the seat back. In addition, any imperfection in the components of the pivot mechanisms, such as play or backlash between the engaging teeth or tolerances between the mechanism components, may allow the rotary member connected to the seat back to move a miniscule amount even when the mechanism is locked. These small movements are magnified by the length of the lever arm and become noticeable at the upper end of the seat. For example, the seat back of an unoccupied seat may tend to oscillate when the vehicle encounters rough road conditions. Because the motion of the seat back is amplified by the length of the seat back frame, the vibration of the seat back can be relatively large. This magnified play in locking pivot mechanisms has been termed "chucking" and refers to any imperfections or play in the mechanism components that allow movement of the rotary member and attached seat back while the mechanism is in a locked condition.

One technique employed to reduce chucking is to form the components of the pivot mechanism with exceedingly close tolerances. This technique reduces play in the mechanism, and thus reduces chucking, but manufacturing to such close tolerance is expensive. Further, close tolerances may bind the components of the system and prevent smooth operation.

SUMMARY OF THE INVENTION

It is therefore desirable to construct a locking recliner mechanism that is relatively small and simple, operates smoothly without binding, and does not require excessively close tolerances, yet is capable of locking the seat back in a fixed position while inhibiting play or excursions.

Accordingly, the compact disc recliner mechanism of the present invention provides a novel configuration to reduce chucking. The present invention provides a novel pawl and pawl carrier configuration with a biasing force applied on a cam urging at least one pawl and the pawl carrier into contact with a drum at three points. These three locking relationships enable firm engagement of the disc recliner mechanism and reduce chucking.

These and other advantages and features will become apparent from the following description and claims in conjunction with the accompanying drawings.

BRIEF DESCRIPTION OF THE DRAWINGS

FIG. 1 is an elevational view of a locking compact disc recliner mechanism according to the invention secured between a base plate adapted to be fixed to a seat base and a quadrant adapted to be fixed to a seat back;

FIG. 5 is a section view along lines 5—5 of FIG. 4;

DETAILED DESCRIPTION OF THE PREFERRED EMBODIMENTS

Figure 2:
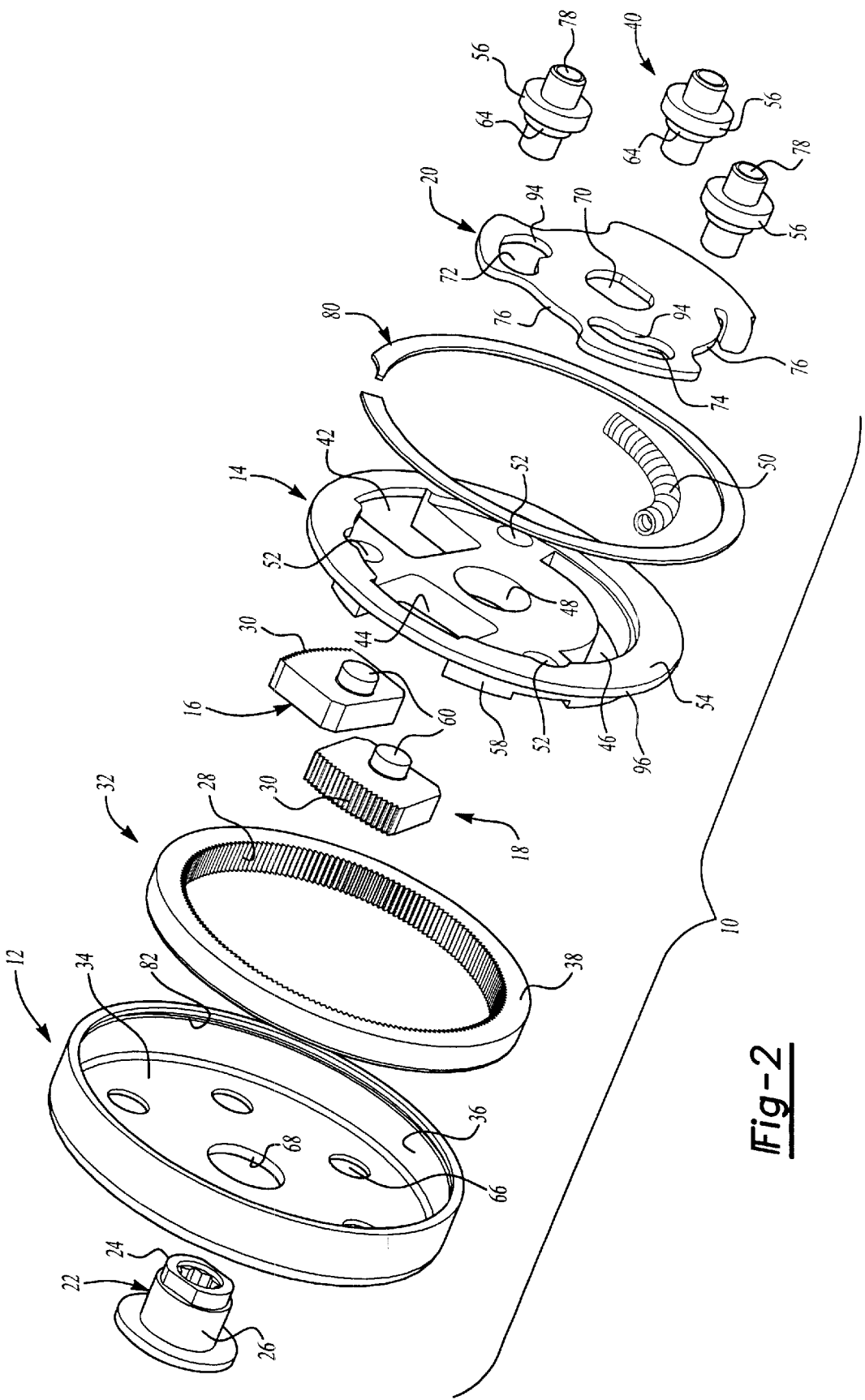
FIG. 2 is an exploded perspective view of the locking compact disc recliner mechanism of FIG. 1.

The present invention generally provides a compact disc recliner mechanism that may be used as a seat recliner to reduce play or chucking of a seat back when the mechanism is locked. Referring to the drawings, the disc recliner mechanism, in its locked mode, includes a biasing force applied on a cam urging three locking members, e.g., two pawls and one locking surface on a pawl carrier or one pawl and two locking surfaces on a pawl carrier, into contact with a drum for locking the seat back relative the seat base. The locking members are disengaged from the drum by overcoming the biasing force in the compact disc recliner mechanism's unlocked mode. The three locking members provide a strong and stable locking mechanism that operates smoothly and reduces chucking without binding or requiring excessively close tolerances.

More particularly, FIGS. 1–5 show a recliner assembly that includes a locking disc recliner mechanism 10 secured between a base plate 6 adapted to be fixed to a seat base 2 and a quadrant 8 adapted to be fixed to a seat back 4. The locking disc recliner mechanism 10 includes a drum 12 adapted to be affixed to the quadrant 8, a pawl carrier 14 adapted to be affixed to the base plate 6, pawls 16, 18 for selectively locking the pawl carrier 14 relative the drum 12, and a cam disc 20 for moving the pawls 16, 18. The drum 12 and pawl carrier 14 are disposed generally coaxially about a shoulder 26 of a pivot axle 22 for rotation about the pivot axle 22. The cam disc 20 is mounted on a keyed end 24 of the pivot axle 22 for fixed rotation with the pivot axle 22, which can be actuated by an occupant-operable handle or lever (not shown).

A ring 32 is fixed to rotate with the drum 12 and together rotate with the quadrant 8 and the seat back 4. The drum 12 includes a base 34 and a cylindrical wall 36. The base 34 includes apertures 66 adapted to receive fasteners (not shown) for securing the drum 12 to the quadrant 8. A central aperture 68 in the base 34 receives the pivot axle 22, whereby the drum 12 is rotatable about the shoulder 26 of the pivot axle 22. When the ring 32 is seated in the drum 12, the outer diameter of the ring 32 abuts the inner diameter surface of a cylindrical drum wall 36. Preferably, the cylindrical wall 36 includes a channel 82 formed in the inner diameter surface adjacent the outermost edge for seating a lock ring 80, which retains the pawl carrier 14 and ring 32 within the drum 12. More particularly, the ring 32 is positioned within the drum 12 such that the cylindrical wall 36 extends laterally beyond the seated ring 32. After the ring 32 is seated in drum 30, the pawl carrier 14 is disposed adjacent a surface 38 of the ring 32 and the lock ring 80 is disposed within the channel 82 to secure the assembly. The inner diameter surface of the ring 32 includes teeth 28 adapted for meshing engagement with the pawls 16, 18.

The pawl carrier 14 includes an outer rim 54 surrounding a generally cylindrical central portion 58 having a pair of slots 42,44 containing pawls 16, 18, respectively, as well as an arcuate slot 46 seating a cam retention spring 50. The spring 50 biases the cam disc 20 to an engaged position wherein the pawls 16, 18 are placed into meshing engagement with the teeth 28 of the ring 32. The cam disc 20 is movable by the operator against the bias of spring 50 to a disengaged position (FIG. 4) wherein pawls 16, 18 are moved away from the teeth 28 of the ring 32. The pawl carrier 14 includes a central aperture 48 adapted to coaxially receive the pivot axle 22 for rotation thereabout. Like drum 12, the pawl carrier 14 is disposed generally coaxially about the shoulder 26 of the pivot axle 22. The central aperture 48 has a diameter slightly larger than the diameter of the shoulder 26, whereby the pawl carrier 14 is able to move radially relative the pivot axle 22 for locking the pawl carrier 14 relative the drum 12. Also, multiple mounting apertures 52 are located in the central portion 58 of the pawl carrier 14 to receive mounting pins 40 that support the cam disc 20 and secure the pawl carrier 14 to the base plate 6 (FIGS. 1 and 5). The outer rim 54 includes a peripheral surface 96 that is spaced apart from the inner diameter surface of the cylindrical drum wall 36 when the pawls 16, 18 disengage the teeth 28 of the ring 32 and engages the wall 36 of the drum 12 when the pawls 16, 18 engage the teeth 28 of the ring 32. The outer diameter of the pawl carrier 14 is preferably approximately 0.5 millimeters smaller than the inner diameter of a drum 12 that is approximately 72 millimeters in diameter.

Figure 3:
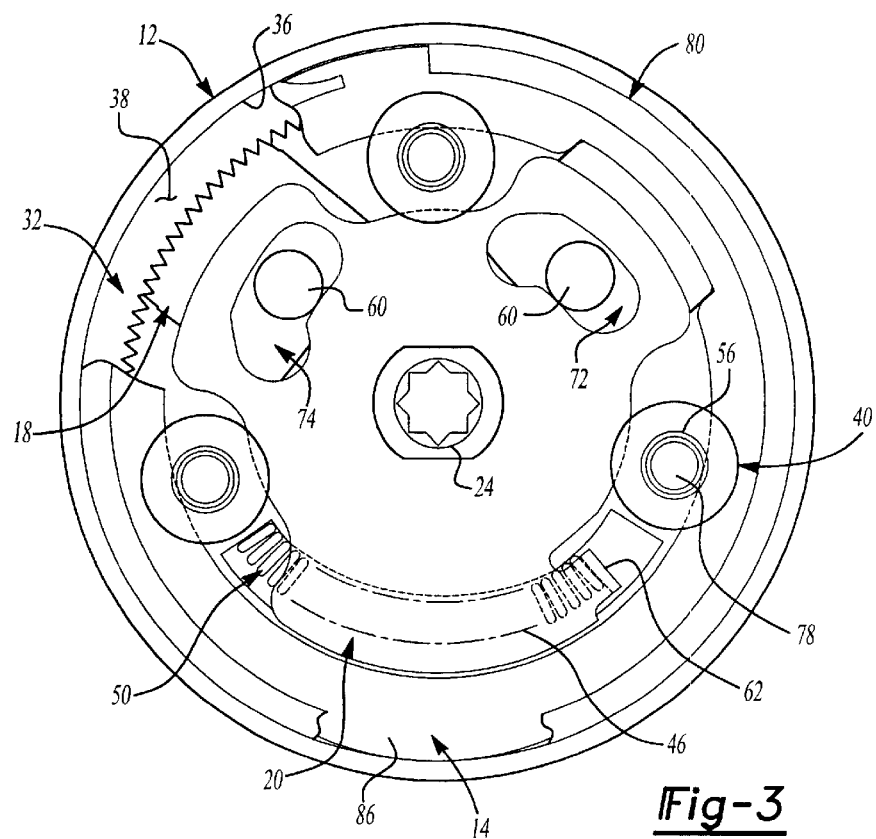
FIG. 3 is a partially sectioned end view of the locking compact disc recliner mechanism of FIGS. 1 and 2 in the locked position.
Figure 4:
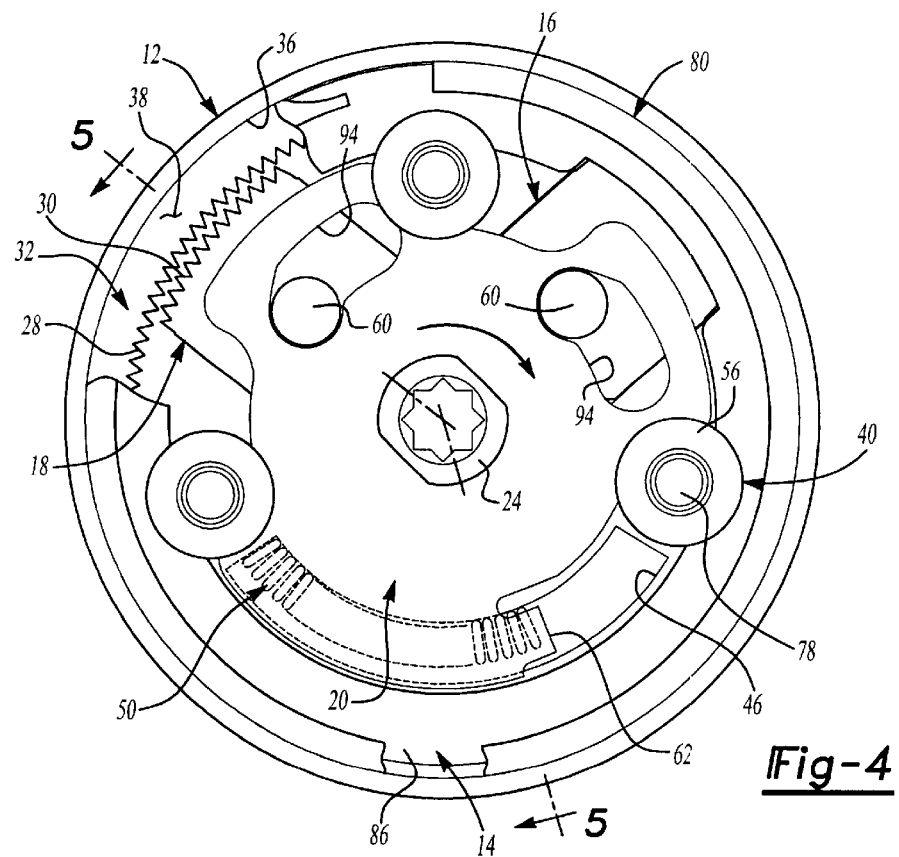
FIG. 4 is a partially sectioned end view of the locking compact disc recliner mechanism of FIGS. 1 and 2 in the unlocked position.
Figure 6:
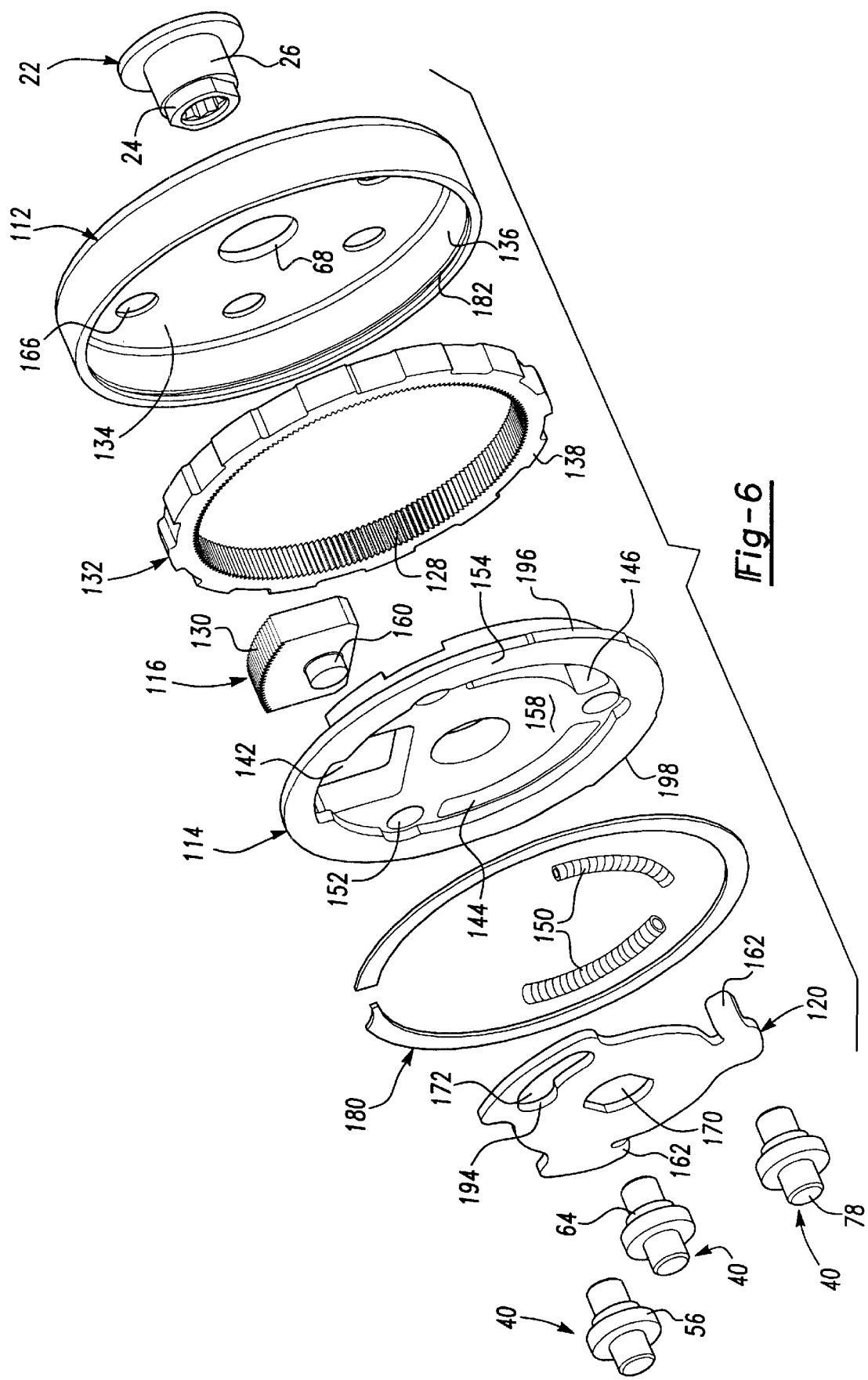
FIG. 6 is an exploded perspective view of a locking compact disc recliner mechanism according to an alternative embodiment of the invention.

The pawls 16, 18 are generally block-like bodies having teeth 30 on one end thereof The pawls 16, 18 are slidably contained in the slots 42,44, respectively, of the pawl carrier 14 to selectively engage the teeth 28 of the ring 32. Further, each pawl 16, 18 includes a pin 60 extending in a direction generally transverse to the teeth 30 for engagement by the cam disc 20, which moves the pawls 16, 18 between their engaged and disengaged positions (FIGS. 3 and 4, respectively).

The cam disc 20 is a generally tri-lobed plate including a keyed central aperture 70 adapted to receive the keyed end 24 of the pivot axle 22. Thus, when the pivot axle 22 rotates, the keyed end 24 forces the cam disc 20 to rotate therewith. The cam disc 20 also includes a finger 62 transversely extending from the body thereof for engaging the spring 50, which biases the cam disc 20 in a counter-clockwise direction (as shown in FIGS. 3 and 4). The cam disc 20 further includes cam slots 72, 74 for slidably receiving the pins 60 of pawls 16, 18, respectively. More specifically, the cam slots 72, 74 include cam surfaces 94 defining the slots 72, 74 and abutting the pins 60. Between the lobes of the cam disc 20 are edge surfaces 76 for abutting the pins 40 mounted in the apertures 52 of the pawl carrier 14. The pins 40 include annular shoulders 56 (FIG. 2) to secure the cam disc 20 against axial movements relative the pawl carrier 14, but permit limited rotation of the cam disc 20 relative to the pawl carrier 14. The magnitude of the rotational movement is defined by the length of the edge surfaces 76 extending between the lobes. Thus, as the pins 40 ride the arcuate edge surfaces 76 upon rotation of the pivot axle 22, the pins 60 of the pawls 16, 18 cam along the edges of cam slots 72, 74, respectively, of the cam disc 20. As the pins 60 move in the slots 72, 74, the pawls 16, 18 slide radially within slots 42, 44 into and out of meshing engagement with teeth 28 of the ring 32.

When assembled, the pawl carrier 14 seats in the drum 12 with its central portion 58 disposed generally coaxial with the ring 32 and its outer rim 54 seated on the surface 38 of the ring 32. The cam retention spring 50 is disposed in the arcuate slot 46, and the transverse finger 62 of the cam disc 20 extends into the arcuate slot 46 and in abutment with an end of the cam retention spring 50. The spring 50 normally biases the cam disc 20 to its engaged position forcing the pawls 16, 18 into engagement with the teeth 28 of the ring 32, as shown in FIG. 3. The cam disc 20 is seated in the central portion 58 and within the inner diameter of the rim 54 of the pawl carrier 14, whereby the spring 50 is retained within the arcuate slot 46. The annular shoulders 56 of the pins 40 retain the cam disc 20 in coaxial abutment with the central portion 58 of the pawl carrier 14. The lock ring 80 is secured within the channel 82 of the drum 12 along the outermost edge of the cylindrical wall 36 such that the assembly of the cam disc 20, the pawl carrier 14, and the ring 32 are retained within the drum 12.

In use, the disc recliner mechanism 10 is secured to both a seat back 4 and a seat base 2 through the quadrant 8 and base plate 6, respectively. More specifically, apertures 66 in the base 34 of the drum 112 are adapted to receive fasteners for securing the drum 12 to the quadrant 8. Similarly, apertures 78 disposed in the pins 40 for supporting the cam disc 20 are adapted to receive fasteners for mounting the pawl carrier 14 to the base plate 6. Preferably, the fasteners are rivets 84, as shown in FIG. 1. The quadrant 8 is secured to the seat back 4 and the base plate 6 is secured to the seat base 2. In this manner, the drum 12 is able to rotate relative the pawl carrier 14 when the seat back 4 is rotated relative the seat base 2 and the teeth 30 of the pawls 16, 18 are disengaged from the teeth 28 of the drum 12.

As shown in FIG. 3, the cam retention spring 50 biases the cam disc 20 into a position that forces the teeth 30 of the pawls 16, 18 into engagement with the teeth 28 of the drum 12. An operator must rotate the pivot axle 22 and the cam disc 20 against the bias of the cam retention spring 50 to disengage the pawls 16, 18 from the teeth 28 of the ring 30, as shown in FIG. 4. When the pawl carrier 14 is rotated, the pins 60 of pawls 16, 18 slide in cam slots 72, 74, respectively. The cam slots 72, 74 are shaped to force the pins 60, and thus the pawls 16, 18, away from the ring 32 during counterclockwise rotation of the cam disc 20 against the bias of spring 50. Upon sufficient counterclockwise rotation, the teeth 30 of pawls 16, 18 disengage the teeth 28 of the ring 32, thereby allowing the seat back 4 to be rotatively adjusted relative the seat base 2. Once disengaged, the drum 12 is able to rotate relative the pawl carrier 14.

When the pawls 16, 18 are in meshing engagement with teeth 28 of the ring 32, an edge 86 of the pawl carrier 14 generally opposite the disposition of the pawls 16, 18 is forced against an adjacent portion of the cylindrical wall 36 such that the peripheral surface 96 engages the cylindrical wall 36. The use of three contact points, i.e., the teeth 30 of pawls 16, 18, and the peripheral surface 96 of the pawl carrier 14, against the cylindrical wall 36 creates a very strong and stable locking mechanism. Further, because only two of the contact points are movable, i.e., pawls 16, 18, the play in the locking disc recliner mechanism 10 is minimized. Thus, the inclusion of a fixed contact point—surface 96 of the pawl carrier 14—provides reduction in play or chucking in a relatively small and simple locking mechanism that operates smoothly without binding and does not require excessively close tolerances.

An alternative embodiment of the invention is shown in FIGS. 1, 6–8 as disc recliner mechanism 110. Like disc recliner mechanism 10, the disc recliner mechanism 110 is secured between the base plate 6 adapted to be affixed to the seat base 2 and the quadrant 8 adapted to be affixed to the seat back 4. The disc recliner mechanism 110 includes a drum 112 adapted to be affixed to the quadrant 8, a pawl carrier 114 adapted to be affixed to the base plate 6, a pawl 116 for selectively locking the pawl carrier 114 relative the drum 112, and a cam disc 120 for moving the pawl 116. The drum 112 and pawl carrier 114 are disposed generally coaxially about the shoulder 26 of the pivot axle 22. The cam disc 120 is mounted on the keyed end 24 of the pivot axle 22 for fixed rotation with the pivot axle 22, which can be actuated by an occupant-operable handle or lever (not shown).

A ring 132 is fixed to rotate with the drum 112 and together rotate with the quadrant 8 and the seat back 4. The drum 112 is similar to the drum 12 and includes a base 134 having apertures 166 for receiving fasteners (not shown) for securing the drum to the quadrant 8. Similar to the prior embodiment, the ring 132 is seated in the drum 112 such that the outer diameter of the ring 132 abuts the inner diameter surface of a cylindrical drum wall 136 and a lock ring 180 seats in a channel 182 formed in the inner diameter surface to retain the pawl carrier 114 and ring 132 within the drum 112. The ring 132 is positioned within the drum 112 such that the cylindrical wall 136 extends laterally beyond the seated ring 132. After the ring 132 is seated in the drum 130, the pawl carrier 114 is disposed adjacent a surface 138 of the ring 132 and the locked ring 80 is disposed within the channel 182 to secure the assembly. The inner diameter surface of the ring 132 includes teeth 128 adapted for meshing engagement with the pawl 116. The pawl carrier 114 includes an outer rim 154 surrounding a generally cylindrical central portion 158 having a slot 142 adapted to contain the pawl 116, as well as a pair of arcuate slots 144, 146 seating cam retention springs 150. The springs 150 bias the cam disc 120 to an engaged position wherein the pawl 116 is placed into meshing engagement with the teeth 128 of the ring 132. The cam disc 120 is moveable by the operator against the bias of the springs 150 to a disengaged position (FIG. 8) wherein the pawl 116 is moved away from the teeth 128 of the ring 132.

Similar to the prior embodiment, the pawl carrier 114 includes a central aperture 148 adapted to coaxially receive the pivot axle 22 for rotation thereabout. The central aperture 148 has a diameter slightly larger than the diameter of the shoulder 26 of the pivot axle 22, whereby the pawl carrier 114 is able to move radially relative the pivot axle 22 for locking the pawl carrier 114 relative the drum 112. Multiple mounting apertures 152 are located in the central portion 158 of the pawl carrier 114 to receive mounting pins 40 that support the cam disc 120 and secure the pawl carrier 114 to the base plate 6 (FIG. 1). The outer rim 154 includes peripheral locking surfaces 196, 198 that are spaced apart from one another and the cam slot 142. Preferably, the cam slot 142 and the peripheral locking surfaces 196, 198 are equidistantly spaced apart on the pawl carrier 114. The locking surfaces 196, 198 are spaced apart from the inner diameter surface of the cylindrical drum wall 36 when the pawl 116 is disengaged from the teeth 128 of the ring 132 and engage the wall 36 of the drum 112 when the pawl 116 engages the teeth 128 of the ring 132. Preferably the outer diameter of the pawl carrier 114 is approximately 0.5 millimeters smaller than the inner diameter of an approximately 72 millimeter diameter drum 112.

Figure 7:
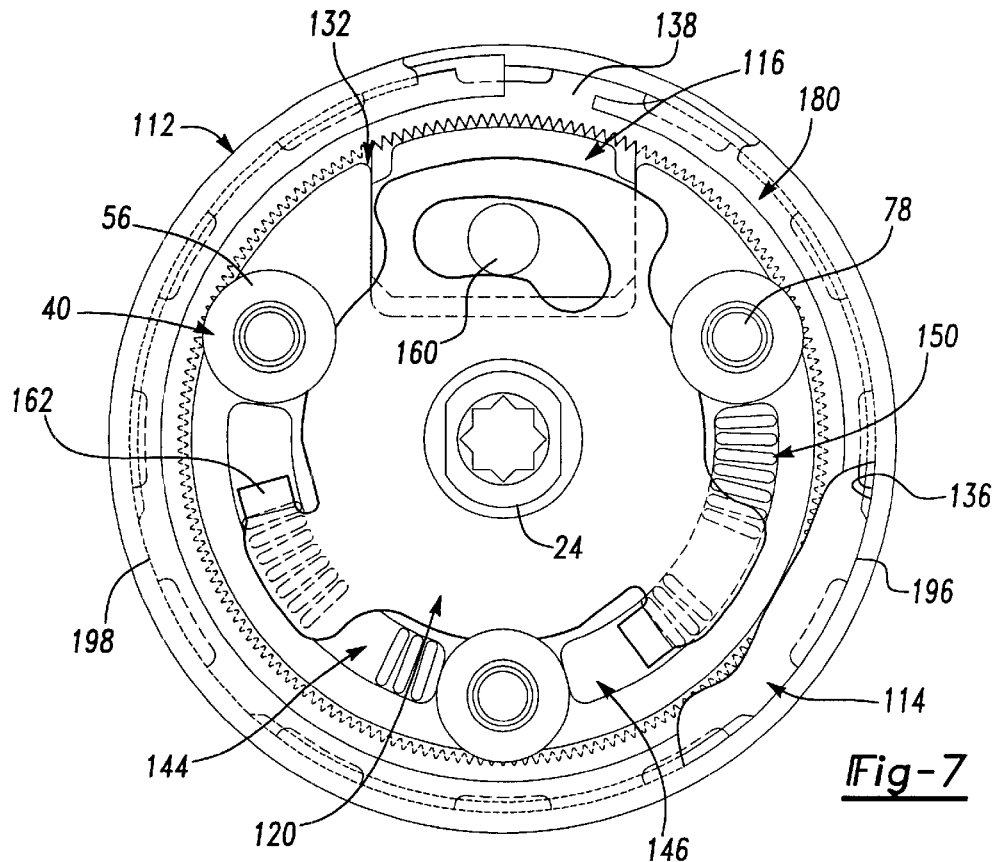
FIG. 7 is a partially sectioned end view of the locking compact disc recliner mechanism of FIG. 6 in the locked position.
Figure 8:
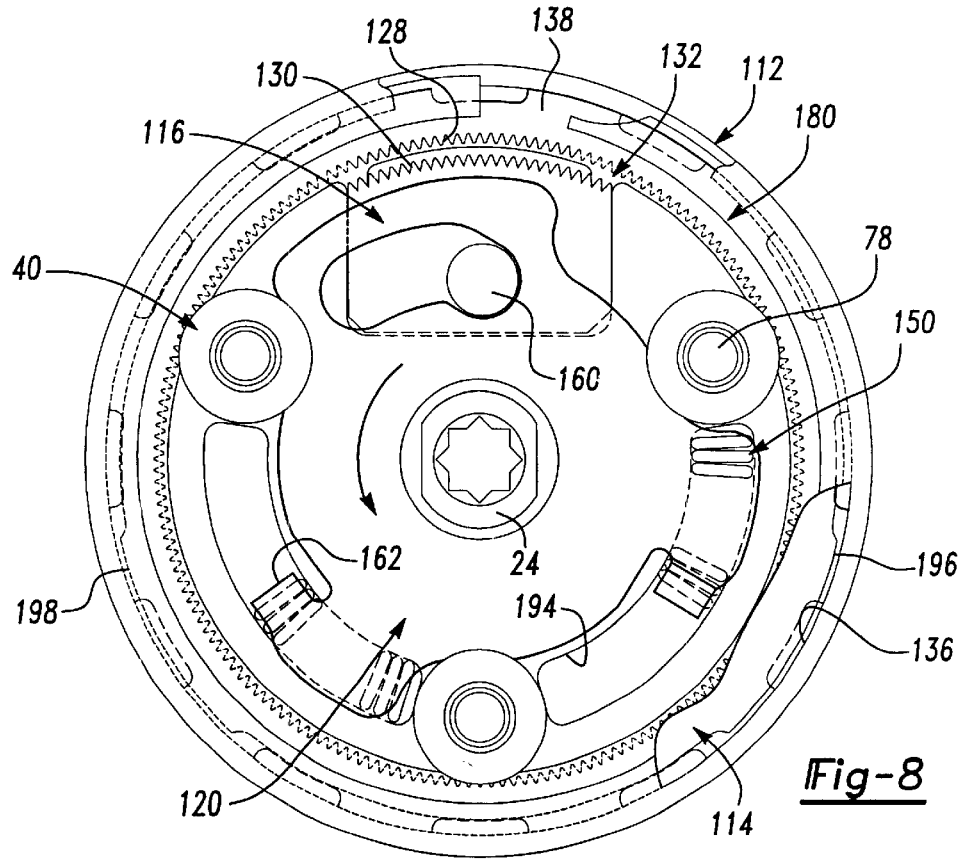
FIG. 8 is a partially sectioned end view of the locking compact disc recliner mechanism of FIGS. 6 and 7 in the unlocked position.

The pawl 116 is a generally block-like body having teeth 130 on one end thereof and is slidably contained in the slot 142 of the pawl carrier 114 to selectively engage the teeth 128 of the ring 132. The pawl 116 includes a pin 160 extending in a direction generally transverse to the teeth 130 for engagement by the cam disc 120, which moves the pawl 116 between its engaged and disengaged positions (FIGS. 7 and 8, respectively).

The cam disc 120 is a generally tri-lobed plate including a keyed central aperture 170 adapted to receive the keyed end 24 of the pivot axle 22. Thus, when the pivot axle 22 rotates, the keyed end 24 forces the cam disc 120 to rotate therewith. The cam disc 120 further includes a pair of spaced apart fingers 162 transversely extending from the body thereof for engaging the springs 150, which bias the cam disc 120 in a clockwise direction (as shown in FIGS. 7 and 8). The cam disc 120 further includes a cam slot 172 for slidably receiving the pin 160 of the pawl 116. The cam slot 172 includes a cam surface 194 defining the slot 172 and abutting the pin 160. Between the lobes of the cam disc 120 are edge surfaces 176 for abutting the pins 40 mounted in the apertures 52 of the pawl carrier 114. The annular shoulders 56 of the pins 40 secure the cam disc 120 against axial movements relative the pawl carrier 114, but permit limited rotation of the cam disc 120 relative the pawl carrier 114. The magnitude of the rotational movement is defined by the length of the edge surfaces 76 extending between the lobes. Thus, as the pins 40 ride the arcuate edge surfaces 176 upon rotation of the pivot axle 22, the pins 160 of the pawl 116 cam along the edge of the cam slot 172 of the cam disc 120. As the pin 160 moves in the slot 72, the pawl 116 slides radially within the slot 142 in the pawl carrier 114 into and out of meshing engagement with the teeth 128 of the ring 132.

When assembled, the pawl carrier 114 seats in the drum 112 with its central portion 158 disposed generally coaxial with the ring 132 in its outer rim 154 seated on the surface 138 of the ring 132. The cam retention springs 150 are disposed in the arcuate slots 144, 146, and the transverse fingers 162 of the cam disc 120 extend into the arcuate slots 144, 146 and in abutment with an end of each cam retention spring 150. The springs 150 normally bias the cam disc 120 to its engaged position forcing the pawl 116 into engagement with the teeth 128 of the ring 132, as shown in FIG. 7. The cam disc 120 is seated in the central portion 158 and within the inner diameter of the rim 154 of the pawl carrier 114, whereby the springs 150 are retained within their slots 144, 146. The annular shoulders 56 of the pins 40 retain the cam disc 120 in coaxial abutment with the central portion 158 of the pawl carrier 114. The lock ring 180 is secured within the channel 182 of the drum 112 along the outermost edge of the cylindrical wall 36 such that assembly of the cam disc 120, the pawl carrier 114, and the ring 132 are retained within the drum 112.

In use, the disc recliner mechanism 110 is secured to both the seat back 4 and the seat base 2 through the quadrant 8 and base plate 6, respectively, as shown in FIG. 1. More specifically, apertures 166 and the base 134 of the drum 112 are adapted to receive fasteners for securing the drum 112 to the quadrant 8. Similarly, apertures 78 disposed in the pins 40 for supporting the cam disc 120 are adapted to receive fasteners for mounting the pawl carrier 114 to the base plate 6. Preferably, the fasteners are rivets 84, as shown in FIG. 1. The quadrant 8 is secured to the seat back 4 and the base plate 6 is secured to the base 2. In this manner, the drum 112 is able to rotate relative the pawl carrier 114 when the seat back is rotated relative the seat base 2 and the teeth 130 of the pawl 116 are disengaged from the teeth 128 of the drum 112.

As shown in FIG. 7, the cam retention springs 50 bias the cam disc 120 into a position that forces the teeth 130 of the pawl 116 into engagement with the teeth 128 of the drum 112. An operator must rotate the pivot axle 22 and the cam disc 120 against the bias of the cam retention springs 150 to disengage the pawl 116 from the teeth 128 of the ring 30, as shown in FIG. 8. When the pawl carrier 114 is rotated, the pin 160 of the pawl 116 slides in the cam slot 72, which is shaped to force the pin 160, and thus the pawl 116, away from the ring 132 during counterclockwise rotation of the cam disc 120 against the bias of the springs 150. Upon sufficient counterclockwise rotation, the teeth 130 of the pawl 116 disengage the teeth 128 of the ring 132, thereby allowing the seat back 4 to be rotatively adjusted relative the seat base 2. Once disengaged, the drum 112 is able to rotate relative the pawl carrier 114.

When the pawl 116 is in meshing engagement with the teeth 128 of the ring 132, the locking surfaces 196, 198 extending radially from the periphery of the pawl carrier 154 are forced against the cylindrical wall 36. Because the locking surfaces 196, 198 are preferably equidistantly spaced apart from each other and the pawl 116, three contact points are made to hold the disc recliner mechanism 10 in position. The use of three contact points, i.e., the teeth 30 of the pawl 116 and the spaced apart peripheral locking surfaces 196, 198 of the pawl carrier 114, against the cylindrical wall 36 creates a very strong and stable locking mechanism. Further, because only one of the contact points is moveable, i.e., pawl 116, the play in the locking disc recliner mechanism is minimized. Thus, the inclusion of a pair of fixed contact points—the locking surfaces 196, 198 of the pawl carrier 114—provide reduction in play or chucking in a relatively small and simple locking mechanism that operates smoothly without binding and does not require excessively close tolerances.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A recliner assembly for use with a seat having a seat back and a seat base, comprising:
   a plate adapted to be fixed to the seat base;
   a quadrant coupled for rotation relative to the plate and adapted to be fixed for rotation with the seat back; and
   a compact disc recliner mechanism including three locking members having locking surfaces for locking said quadrant relative said plate, first and second locking members being movable relative to said quadrant, and a third locking member being fixed relative to said quadrant, said first locking member selectively in meshed engagement with said third locking member, and said second locking member selectively in fixed frictional engagement relative to said quadrant.

2. The recliner assembly according to claim 1 wherein said compact disc recliner mechanism includes a drum adapted to be fixed for rotation with one of said plate and said quadrant and cooperating with said locking surfaces for locking said quadrant relative said plate.

3. The recliner assembly according to claim 2 wherein said drum includes an annular surface with drum teeth disposed therealong and said first locking member is a first pawl having pawl teeth adapted to mesh with said drum teeth for releasably locking said drum in position.

4. The recliner assembly according to claim 3 wherein said second locking member is a pawl carrier adapted to be coupled to the other of said one of said plate and said quadrant and wherein a locking surface on said pawl carrier is selectively in fixed frictional engagement with said drum for locking said drum in position.

5. The recliner assembly according to claim 4 wherein said third locking member is a second locking surface on said pawl carrier adapted to engage said drum for releasably locking said drum in position.

6. The recliner assembly according to claim 3 further comprising a cam for moving said first pawl from a first position engaging said drum teeth to a second position disengaging said drum teeth.

7. The recliner assembly according to claim 3 further comprising a fourth locking member movable relative to said quadrant.

8. The recliner assembly according to claim 7 wherein said fourth locking member is a second pawl having pawl teeth adapted to mesh with said drum teeth for releasably locking said drum in position.

9. The recliner assembly according to claim 8 wherein said pawl carrier includes a cam for moving said second pawl from a first position engaging said drum teeth to a second position disengaging said drum teeth.

10. A compact disc recliner mechanism for reducing chucking, comprising:
   a drum adapted to be fixed to a plate and for rotation relative a quadrant;
   first and second locking members movable relative the quadrant from a first position in meshed engagement with the drum to a second position disengaging said drum;
   a third locking member fixed relative the quadrant and movable from a first position in frictional fixed engagement with said drum to a second position disengaging said drum; and
   a cam surface moving said first, second, and third locking members from said first position engaging said drum to said second position disengaging said drum.

11. The compact disc recliner mechanism according to claim 10 wherein said drum includes an annular surface with teeth disposed therealong and said first and second locking members have teeth adapted to mesh with said drum teeth for releasably locking said drum in position.

12. The compact disc recliner mechanism according to claim 11 wherein said first and second locking members are first and second pawls.

13. The compact disc recliner mechanism according to claim 12 wherein the third locking member is a pawl carrier including a surface adapted to frictionally engage said drum for releasably locking said drum in position.

14. The compact disc recliner mechanism according to claim 13 wherein said pawl carrier includes an outer rim, said outer rim including said surface adapted to frictionally engage said drum for releasably locking said drum in position.

15. The compact disc recliner mechanism according to claim 14 wherein said cam surface is at least one cam slot in a cam disc, said cam disc being mounted for rotation relative said drum and moving said first and second pawls from said first position engaging said drum to said second position disengaging said drum.

16. A compact disc recliner mechanism for reducing chucking, comprising:
- a drum adapted to be fixed to a plate and for rotation relative a quadrant;
- a first locking member movable relative the quadrant from a first position in meshed engagement with said drum to a second position disengaging said drum;
- second and third locking members fixed relative the quadrant and movable from a first position frictionally engaging said drum to a second position disengaging said drum; and
- a cam surface moving said first, second, and third locking members from said first position engaging said drum to said second position disengaging said drum.

17. The compact disc recliner mechanism according to claim 16 wherein said drum includes an annular surface with teeth disposed therealong and said first locking member has teeth adapted to mesh with said drum teeth for releasably locking said drum in position.

18. The compact disc recliner mechanism according to claim 17 wherein said first locking member is a pawl.

19. The compact disc recliner mechanism according to claim 18 wherein said second and third locking members are locking surfaces on a pawl carrier, said locking surfaces adapted to be in selective frictional engagement with said drum for releasably locking said drum in position.

20. The compact disc recliner mechanism according to claim 19 wherein said pawl carrier includes an outer rim, said outer rim including said locking surfaces adapted to frictionally engage said drum for releasably locking said drum in position.

21. The compact disc recliner mechanism according to claim 20 wherein said cam surface is at least one cam slot in a cam disc, said cam disc being mounted for rotation relative said drum and moving said first pawl from said first position engaging said drum to said second position disengaging said drum.

22. A compact disc recliner mechanism adapted to pivotally couple a seat back to a seat base for selectively adjusting the angular position of the seat back relative to the seat base, said compact disc recliner mechanism being operable in a locked mode to fix the angular position of the seat back relative to the seat base and an unlocked mode wherein the seat back is pivotable relative to the seat base, said compact disc recliner mechanism comprising:
- at least three locking surfaces for locking said seat back relative the seat base;
- a drum adapted to be fixed for rotation with one of the seat back and seat base, said drum having drum teeth;
- a carrier adapted to rotate relative said drum, said carrier including at least one of said locking surfaces as an abutment that engages said drum when the compact disc recliner mechanism is in its locked mode;
- at least one pawl coupled to said carrier for movement relative thereto between engaged and disengaged positions, said pawl including another of said locking surfaces as pawl teeth on said at least one pawl, said pawl teeth engaging said drum teeth when said at least one pawl is in said engaged position, said pawl teeth being disengaged from said drum teeth when said at least one pawl is in said disengaged position;
- a cam disc coupled to said carrier, said cam disc being rotatable relative to said carrier between a locked position and an unlocked position;
- a spring coupled to said cam disc to bias said cam disc toward said locked position; and
- wherein said at least one pawl is operatively coupled to said cam disc and said cam disc moves said at least three locking surfaces into said engaged position and the compact disc recliner mechanism into its locked mode when said cam disc is moved into said locked position, and said cam disc moved said at least three locking surfaces into said disengaged position and the compact disc recliner mechanism into its unlocked mode when said cam disc is moved into said unlocked position.

23. The compact disc recliner mechanism of claim 22 further comprising a pivot axle disposed centrally through said drum and said pawl carrier and including a keyed end for rotating said cam disc relative said pawl carrier and moving said at least three locking surfaces from said engaged position to said disengaged position.

24. The compact disc recliner mechanism of claim 23 wherein said teeth of said drum are disposed on a ring mounted along said inner diameter surface of said drum.

* * * * *